United States Patent Office 3,753,907
Patented Aug. 21, 1973

3,753,907
LUBE COMPOSITION CONTAINING
AZIRIDINE DERIVATIVES
Haakon Haugen, Beacon, and James G. Dadura, Fishkill,
N.Y., assignors to Texaco Inc., New York, N.Y.
No Drawing. Filed May 13, 1971, Ser. No. 143,185
Int. Cl. C10m 1/48
U.S. Cl. 252—46.7                                        7 Claims

ABSTRACT OF THE DISCLOSURE

An aziridine detergent-dispersant derivative, lube oil compositions containing said derivative, and manufacture thereof, said derivative being the reaction product of an aziridine of the formula:

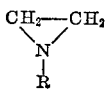

where R is hydrogen or ω-aminoalkyl of from 1 to 5 carbons and a monoethoxylated hydrolyzed polyalkene-$P_2S_5$ reactant, said derivative prepared by:
  (a) first contacting an aliphatic polyalkene of an average molecular weight of between about 50 and 5000 with $P_2S_5$ in the presence of sulfur at a first elevated temperature,
  (b) second contacting the resulting polyalkene-$P_2S_5$ reaction product with steam at a second elevated temperature,
  (c) removing inorganic phosphorus acid from the steam treated (hydrolyzed) polyalkene-$P_2S_5$ reaction product,
  (d) third contacting the inorganic acid free, steam treated polyalkene-$P_2S_5$ reaction product with ethylene oxide at a third elevated temperature in a mole ratio of said inorganic acid free, steam treated $P_2S_5$-polyalkene reaction product to said ethylene oxide of between about 1:1 and 1:1.5 to form said monoethoxylated reactant,
  (e) fourth contacting the ethoxylated derivative with said aziridine at a fourth elevated temperature utilizing a mole ratio of said derivative to said aziridine of between about 3:1 and 1:2 to form said detergent-dispersant derivative.

Background of invention

The trend towards high performance internal combustion engines and the introduction of emission control devices on motor vehicles have created a need for improved premium motor oils. Further, because of the ever increasing severity of the specifications of both the automobile manufacturers and the military, the modern crankcase lubricant must also have excellent diesel properties. To meet these demands for higher quality lubricants, new and improved additives are necessary. This need is particularly acute in the field of detergent-dispersant additives. The detergent-dispersant additives function among other things to (1) reduce sludge content of oils by maintaining formed sludge materials during engine operation in oil soluble dispersion, (2) reduce or inhibit the formation of varnish (resin) on engine surfaces and (3) inhibit the plugging of the positive crankcase ventilation (PCV) valve. In respect to the PCV valve if the valve becomes plugged or substantially plugged the amount of sludge and resin precursors that are trapped in the crankcase will make effective lubrication very difficult. Although ashless dispersant such as the ethylene oxide derivative of an inorganic acid free, steam hydrolyzed polyalkene-$P_2S_5$ reaction product as taught in U.S. Pat. Nos. 3,087, 956 and 3,272,744 have good sludge dispersion and resin and varnish inhibiting properties, it is only moderately effective in preventing the PCV valve from plugging.

Summary of invention

We have discovered and this constitutes our invention a new detergent-dispersant additive for hydrocarbon crankcase motor oils which has improved properties in respect to dispersing sludge, inhibiting varnish and resin build-up and is substantially superior in retarding the plugging of PCV valves. Another embodiment of the invention is the manufacture of said additive and still another embodiment are crankcase lubricating oil compositions containing the novel additive.

More specifically, the invention pertains to a novel detergent-dispersant, manufacture and hydrocarbon lubricating compositions thereof, said dispersant being the reaction product of an aziridine characterized by the formula:

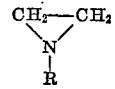

where R is hydrogen or omega (ω)-aminoalkyl of from 1 to 5 carbons and a monoethoxylated derivative of an inorganic acid free, steam hydrolyzed polyalkene-$P_2S_5$ reaction product.

Detailed description of the invention

In detail, the ashless detergent-dispersant additives of the invention are in essence a complex mixture of numerous individual compounds and are, therefore, characterized in terms of their method of preparation.

Specifically, the aziridine derivative of the monoethoxylated inorganic acid free, steam hydroylzed $P_2S_5$ reaction product is formed by first forming the inorganic phosphorus acid free, steam hydrolyzed polyalkene-$P_2S_5$ precursor. This is accomplished by the reaction of $P_2S_5$ (5–40 wt. percent of the reaction mass) with a polyalkene wherein the alkene monomer is from 1 to 5 carbons such as polyethylene, polypropylene, polybutylene, polyisobutylene, polypentylene having an average molecular weight between about 500 and 5000. The reactions are conducted in the presence of between about 0.1 and 5 wt. percent sulfur at an elevated temperature of between about 100 and 320° C., normally in a non-oxidizing atmosphere, for example, under a blanket of nitrogen, normally for a period of between about 1 and 10 hours. The reaction mixture if not in a liquid state is placed in a liquid state under preferred conditions. The liquefaction is accomplished by diluting the reaction mixture with a mineral lubricating oil having an SUS viscosity at 100° F. between about 50 and 1000. The lubricating oil usually constitutes between about 25 and 75 wt. percent of the diluted reaction product concentrate.

The mineral oil diluted or undiluted polyalkene-$P_2S_5$ reaction product is then hydrolyzed by contacting with steam desirably at a temperature between about 100 and 260° C. Under advantageous conditions, at least about one mole of steam per mole of reaction product is employed and the hydrolysis is normally conducted for a period of time of from 1 to 20 hours. The inorganic phosphorus acids formed during the hydrolysis are removed from the hydrolyzed reaction product prior to reaction with the ethylene oxide by standard procedures. A number of different removal procedures are available. In U.S. Pats. 2,951,835 and 2,987,512 removal is effected by contact with synthetic hydrous alkaline earth metal silicate and synthetic hydrous alkali metal silicates respectively. Inorganic phosphorus acids can also be removed by extraction with anhydrous methanol as disclosed in U.S. Pat. 3,135,729 which describes a process wherein organic phosphorus acids are eliminated from the hydrolyzed product by first drying the hydrolyzed product by passing inert gas such as nitrogen therethrough at between about 120 and 200° C. and then contacting the inorganic acids with anhydrous methanol under mixing conditions at a temperature between about 40 and 80° C. in a methanol amount of between about 30 and 80 volume percent based on the overall mixture thereby forming an extract phase containing inorganic phosphorus acid and a mineral oil raffinate base containing inorganic phosphorus acid free, steam hydrolyzed $P_2S_5$-polyalkene reaction product. During the extraction procedure superatmospheric pressure may be applied, e.g., up to about 50 p.s.i.g. in order to maintain the methanol in the liquid state. At the end of the extraction step any methanol carried over into the raffinate phase is preferably removed, e.g., by stripping the raffinate with an inert gas such as nitrogen at an elevated temperature.

The inorganic phosphorus acid free hydrolyzed polyalkene-$P_2S_5$ reaction product is then contacted with ethylene oxide in a mole ratio of oxide to reaction product of between about 1:1 and 1.5:1 at a temperature between about 60 and 150° C., preferably at 80–125° C., normally heating under reflux conditions for a period of time ranging from between about 0.5 and 2 hours, advantageously under pressures of from 10–500 p.s.i.g. The reaction mixture is advantageously blown with an inert gas such as nitrogen at a temperature between about 100 and 125° C. until the product is free of unreacted ethylene oxide.

If desired, the ethylene oxide intermediate may have its odor reduced for better consumer acceptance of the final product. In said odor reduction nitrogen dioxide or a mixture of nitrogen dioxide and oxygen alternatively diluted with an inert gas such as nitrogen is contacted, e.g., bubbled through with a derivative at a temperature between about 65 and 150° C. until at least about 0.15 wt. percent nitrogen dioxide, and preferably less than about 0.22 wt. percent nitrogen dioxide is absorbed by the derivative based on the weight of the derivative. Under advantageous conditions, nitrogen dioxide is diluted with air or an inert gas such as nitrogen, carbon dioxide and the like, containing about 1 volume percent or more of nitrogen dioxide. Advantageously, the reactive gas is introduced into the derivative at a rate of between about 0.001 to 0.5, preferably between about 0.01 and 0.02 standard cubic feet (s.c.f.)/lb. of derivative per hour. The residual oxides of nitrogen are removed by stripping with a relatively inert gas such as nitrogen or air.

In the third final stage of the reaction, the mono ethoxylated hydrolyzed-$P_2S_5$ reaction product from the second stage is contacted, preferably in an inert atmosphere (e.g. nitrogen), with an aziridine characterized by the formula:

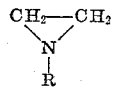

where R is hydrogen or ω-aminoalkyl of from 1 to 5 carbons, at a temperature between about 20 and 130° C., utilizing a mole ratio of reaction product to aziridine of between about 3:1 and 1:2, advantageously for a period of time between about 1 and 8 hours to form the desired aziridine derivative product of monoethoxylated inorganic phosphorus acid free, steam hydrolyzed polyalkene-$P_2S_5$ reaction product.

Under preferred conditions, when ω-aminoalkyl aziridine is employed the mole ratio is preferably about about 1:1, when ethyleneimine is employed, the mole ratio is preferably between 2:1 and 1:2 for maximum desirable properties. Further, under preferred conditions, when the derivative is of a ω-aminoalkyl aziridine, it is desirable to extract the final product with a mixture (e.g. weight ratio of from 1:3 to 3:1) of a liquid alkane (e.g. pentane) and liquid alkanol (e.g. methanol) of less than 7 carbons normally at temperatures between 20 and 50° C. recovering the purified derivative as extractant. This extraction improves the sludge inhibiting, resin inhibition and varnish inhibition properties of the derivative. No substantial incremental improvement is obtained with the extraction of the ethyleneimine derivative.

Specific examples of aziridine reactants contemplated herein are ethyleneimine, N-(2-aminoethyl) aziridine, N-(3-aminopropyl) aziridine and N-(5-aminopentyl) aziridine.

In the lubricating oil compositions containing the aziridine derivatives of the invention, hydrocarbon mineral oil is employed as the base material such as paraffin base, naphthene base or mixed paraffin based distillate or residual oils. The lubricating mineral oil base generally has been subjected to solvent refining to improve its lubricity and viscosity-temperature relationship as well as solvent dewaxing to remove waxy components and improve the pour of the oil. Broadly speaking, a mineral lubricating oil having an SUS viscosity at 100° F. between about 50 and 1000 may be used in the formulation of the improved lubricants of this invention. Advantageously, the viscosity range falls between about 70 and 300 SUS at 100° F.

The aziridine derivatives of the invention are present in the mineral lubricating oil base in concentrations sufficient to impart detergent-dispersancy, varnish and resin formation inhibiting amounts. In concentrations used in the formulation of the finished lubricant, the concentration of the derivative can be as high as 50 wt. percent. In finished lubricants the concentration of the additive falls between about 0.2 and 10 wt. percent and concentrations of between about 1 and 5 weight percent are often employed.

The mineral lubricating oils containing the derivatives of the invention usually contain other additives designed to impart other desirable properties thereto, for example, VI improvers such as polymethacrylates are normally included therein as are corrosion inhibitors and supplementary detergents, A widely used VI improver is polymethacrylate having the general formula:

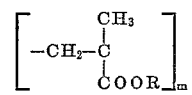

where R is an alipatic radical of from 1 to 20 carbons, e.g.

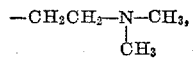

methyl, ethyl, decyl and m is an integer between 600 and 35,000.

Another commonly used supplementary lube oil additive is an alkaline earth metal alkylphenolate. Barium nonyl phenolate, barium dodecylcresolate and calcium dodecylphenolate are examples of such detergents. These products which are well known detergent additives are usually present in the lubricating oil in a concentration between about 0.1 and 5 wt. percent.

Still another commonly used supplementary lube oil additive are detergents such as overbased calcium hydrocarbon sulfonate, overbased with calcium carbonate as disclosed in U.S. 3,027,325, 3,312,618 and 3,537,996. This additive is also normally present in an amount of 0.1 and 5 wt. percent.

An often used supplementary lube oil inhibitor and antioxidant is a divalent metal dialkyl dithiophosphate resulting from the neutralization of a $P_2S_5$-alcohol reaction product with a divalent metal or divalent oxide. Barium and zinc dialkyl dithiophosphates are widely used oxidation and corrosion inhibitors. Metal dialkyl dithiophosphates are usually present in the lubricant in concentrations between about 0.1 and 3 wt. percent.

The following examples furher illustrate the invention but are not to be taken as limitations thereof.

EXAMPLE I

This example illustrates the preparation of the inorganic acid free, hydrolyzed polybutene-$P_2S_5$ precursor from which the monoethoxylated reactant is derived.

To 400 lbs. of polyisobutene of an average molecular weight of about 1300 there is added 79.3 lbs. of $P_2S_5$ and 4 lbs. of elemental sulfur. The reaction mixture is heated under a blanket of nitrogen at a temperature of 232° C. for a period of 6 hours. At the end of the reaction period the resultant isobutene-$P_2S_5$ reaction mixture is diluted with 620 lbs. of hydrocarbon mineral oil of an SUS viscosity of 100 at 100° F. The resultant lube oil concentrate of the reaction mixture is hydrolyzed by bubbling steam therethrough at a temperature of 176° C. The steam contact is continued for a period of about 10 hours at a steam rate of about 10 lbs. per hour.

To the 1084 lbs. of steam hydrolyzed polyisobutene-$P_2S_5$ reaction product there is added under mixing conditions 466 lbs. of anhydrous methanol at about 60° C. for a period of about 6 hours in order to extract into the methanol phase any inorganic phosphorus acids formed during the previous steam hydrolysis step. At the end of the methanol treating period the mixture is allowed to settle and methanol phase is decanted therefrom leaving an oil raffinate of a neut. number of about 20 containing an inorganic acid free, steam hydrolyzed polyisobutene (1300 M.W.)-$P_2S_5$ reaction product.

EXAMPLE II

This example illustrates the preparation of the monoethoxylated derivative reactant of the inorganic acid free, steam hydrolyzed polyalkene-$P_2S_5$ precursor prepared in Example I.

With 130 lbs. of the oil phase of the type prepared in Example I containing the inorganic acid free, steam hydrolyzed polyisobutene (~1300 M.W.)-$P_2S_5$ reaction product there was reacted 20 lbs. of ethylene oxide in a 30 gallon stainless steel reactor.

Specifically, air was removed from the system by heating to 105° C. while blowing with nitrogen and ethylene oxide was introduced into the system at a sufficient rate to maintain a gentle reflux. The nitrogen flow was reduced during the ethylene oxide additions. When rapid reflux of ethylene oxide was known, ethylene oxide addition was reduced and the reaction mixture allowed to reflux for approximately 2 hours to assure completion of the reaction. Excess ethylene oxide was then removed from the reaction mixture by increasing the nitrogen rate and blowing for 2 hours at a temperature of about 105° C. followed by $NO_2$ blowing to an $NO_2$ dosage of 0.2 wt. percent. After about 2 hours of nitrogen blowing the product was cooled to room temperature and there was produced 129.8 lbs. of deodorized monoethoxylated intermediate derivative of the inorganic acid free, steam hydrolyzed polybutene (1300 M.W.) $P_2S_5$ reaction product having the following analysis:

| Test: | Result |
|---|---|
| Neut. number | 3.6 |
| Hydroxyl number | 18.2 |
| Percent phosphorus | 0.97 |
| Percent sulfur | 0.68 |

EXAMPLE III

This example illustrates the preparation of the ethyleneimine derivative of the monoethoxylated derivative of the type produced in Example II.

To 2713 grams (1 mole) of monoethoxylated derivative of Example II kept at 50° C. under a blanket of nitrogen at atmospheric pressure there was added 43 grams (1 mole) of ethyleneimine dropwise. The mixture was heated to 80° C. for 4 hours. The resultant product weighed 2676 grams (97% of theory) and contained 0.28% nitrogen (calculated 0.5 wt. percent, 0.63 wt. percent sulfur (0.6 wt. percent theory), 1.01 wt. percent phosphorus (1.0 wt. percent theory) and had a total base number (TBN) of 7 (calculated 20) and a neut. number of 2.6 (calcd. 0).

EXAMPLE IV

This example illustrates the preparation of the N-(2-aminoethyl) aziridinyl derivative of the monoethoxylated reaction product of the type produced in Example II.

To 3250 grams (1.2 moles) of monoethoxylated reaction product of Example II kept at 50° C. under a blanket of nitrogen at atmospheric pressure there was added 105 grams (1.2 moles) of N-(2-aminoethyl) aziridine dropwise. The mixture was heated to 130° C. for 6 hours and then was extracted with 2.4 liters pentane and 1 liter methanol. The pentane soluble part was solvent stripped under reduced pressure to give 3030 grams (90% yield) of product containing 0.8 wt. percent nitrogen (1 wt. percent calculated), 0.69 wt. percent sulfur (0.6 theory), 0.97 wt. percent phosphorus (1.0 wt. percent theory) with a TBN of 14 (calculated 40) and a neut. number of 6.4 (calculated 0).

EXAMPLE V

This further example illustrates the additive and method of the invention and comparative additives.

Run 1

To 2800 grams (1 mole) of monoethoxylated derivative of Example II kept at 50° C. under a blanket of nitrogen at atmospheric pressure there was added 86 grams (2.0 moles) of ethyleneimine dropwise. The mixture was heated to 80° C. for 3 hours. The resultant product weighed 2805 grams (97% of theory) and was identified as the ethyleneimine derivative of the monoethoxylated reaction product of Example II.

Run 2

Same procedure as Example III, but smaller scale, i.e., 543 grams (0.2 mole) of monoethoxylated derivative of Example II was reacted with 8.6 grams (0.2 mole) ethyleneimine. The product weighed 525 grams (95% of theory) and was identified as the ethyleneimine derivative of the monoethoxylated derivative of Example II.

Run 3

The Run 2 product in an amount of 200 grams (0.07 mole) was extracted with a mixture of 400 mls. of pentane and 125 mls. of methanol. The pentane soluble part was stripped under reduced pressure to give 184 grams (92% of theory) of extracted Run 2 product.

Run 4

The Run 1 product in an amount of 2904 grams was prepared and extracted with a mixture of 2400 mls. of pentane and 1000 mls. of methanol. The pentane soluble portion was stripped under reduced pressure to give 2788 grams (96% of theory) of an extracted Run 1 product.

Run 5

To 5600 grams (2 moles) of monoethoxylated derivative of Example II kept at 50° C. under a blanket of nitrogen at atmospheric pressure was added 43 grams (1 mole) of ethyleneimine dropwise. The mixture was heated to 80° C. for 5 hours. The resultant product weighed 5638 grams (yield 100% of theory) and was identified as the ethyleneimine derivative of the Example II monoethoxylated product.

Run 6

To 280 grams (0.1 mole) of monoethoxylated derivative of Example II kept at 50° C. under a blanket of nitrogen at atmospheric pressure there was added 18.0 grams (0.2 mole) of N-(2-aminoethyl) aziridine dropwise. The mixture was heated to 130° C. for 3 hours. Two hundred grams of this product were extracted with 400 mls. of pentane and 125 mls. of methanol. This pentane soluble part was solvent stripped under reduced pressure to give 181 grams (90.5% of theory) of the N-(2-aminoethyl) aziridine derivative of the monoethoxylated product of Example II.

Run 7

To 280 grams (0.1 mole) of monoethoxylated derivative of Example II kept at 25° C. under a blanket of nitrogen at atmospheric pressure there was added 27.0 grams (0.3 mole) of N-(2-aminoethyl) aziridine. The mixture was heated to 50° C. for 1 hour and to 100° C. for 3 hours. Two hundred grams of this product was extracted with 400 mls. of pentane and 125 mls. of methanol. The pentane soluble part was solvent stripped under reduced pressure to give 180 grams (yield 90.0% of theory) of N-(2-aminoethyl) aziridine derivative of the monoethoxylated product of Example II.

The additive products of the above runs were analyzed and the results are as follows:

TABLE I.—ANALYSIS OF ETHYLENEIMINE AND N-(2-AMINOETHYL) AZIRIDINE DERIVATIVES OF EXAMPLE II PRODUCT

| | Analysis | | | | |
|---|---|---|---|---|---|
| | Weight percent | | | | |
| Run | P | S | N | N.N | TBN |
| 1 | 0.87 | 0.57 | 0.82 | 7.0 | 12 |
| 2 | 1.0 | 0.63 | 0.30 | 2.6 | 6 |
| 3 | 1.0 | 0.60 | 0.28 | 3.8 | 7 |
| 4 | 0.87 | 0.54 | 0.82 | 3.9 | 17 |
| 5 | 0.96 | 0.61 | 0.18 | 3.2 | 4.5 |
| 6 | 0.88 | 0.49 | 1.2 | 4.1 | 27 |
| 7 | 0.90 | 0.47 | 1.6 | 2.9 | 44 |

EXAMPLE VI

This example illustrates the lubricating oil compositions suitable for automotive use containing the derivatives of the invention and the superior function of the derivatives of the invention in respect to detergent dispersancy inhibition of engine varnish, resin and plugging of the positive crankcase ventilation valve.

The base lubricating oil composition, hereinafter designated as Base Oil A, employed in the subsequent tests consists of a refined paraffinic distillate oil of an SUS viscosity of about 130 at 100° F. containing 0.35 wt. percent Ca in the form of calcium carbonate overbased calcium alkylated benzene sulfonate (alkylated benzene of ~450 M.W.), 0.12 wt. percent zinc as zinc isopropyl 1,3-dimethylbutyl dithiophosphate and 0.5 wt. percent of a copolymer of lauryl and stearyl methacrylate in approximately 4:1 weight ratio in mineral oil (~145 SUS at 100° F.) in a copolymer to oil weight ratio of 2:3.

A brief description of the tests employed are as follows:

Bench sludge test (BST)

The procedure comprises introducing into a bottle the test oil composition, cetane, titanium oxide (6 wt. percent) in oil, the titanium being coated with resinified hydrocarbon blowby. The mixture is heated and agitated for 24 hours and centrifuged. The results are reported in mm. sediment depth and is inversely related to the ability of the lubricant formulation to disperse the foreign material in the formulation. Values of about 3.5 to 2.5 mm. sediment indicate little or no dispersancy. Values of 2.5 to 1.8 indicate a substantial level of dispersancy and values below 1.8 are only obtained for formulations of outstanding dispersancy.

Resin inhibition test (RIT)

This procedure is run by combining test oil with hydrocarbon blowby and hydrocarbon lubricating oil. The resultant mixture is heated at an elevated temperature, diluted with additional mineral oil and the Lumetron turbidity of the sample is measured. The results range from 100% to 0% turbidity. A rating less than 40 is usually favorable. The weight ratio of test composition to engine blowby to diluent oil is about 1:1.25:1.

Ford MS-VB

The procedure of this test is outlined in ASTM Special Technical Publication No. 315-C entitled "Engine Test Sequences For Evaluating Automotive Lubricants For API Service MS." A sludge rating and varnish rating of 50 indicates a clean engine with decreasing values indicating increasing sludge and varnish deposition. The PCV valve rating given in percent of plugging thereof.

The additives tested, whose results are reported below in Tables II and III were essentially those prepared in Examples II, IV and V. Runs A, J, K and A¹ are comparative.

TABLE II.—BENCH TEST EVALUATION

| Run | Additive,ª product Ex. II reacted with— | Ex. II: amine mole ratio | Additive extracted ᵇ | BST | RIT |
|---|---|---|---|---|---|
| A | | | | 2.5 | 50 |
| B | Ethyleneimine (Run 5) | 2:1 | No | 1.0 | |
| C | Ethyleneimine (Run 2) | 1:1 | No | 1.0 | 5 |
| D | Ethyleneimine (Run 3) | 1:1 | Yes | 0.9 | 3 |
| E | Ethyleneimine (Run 4) | 1:2 | Yes | 1.1 | Clear |
| F | Ethyleneimine (Run 1) | 1:2 | No | 1.0 | Clear |
| G | N-(2-aminoethyl) aziridine (ex. IV) | 1:1 | No | 2.5 | 17 |
| H | N-(2-aminoethyl) aziridine (Ex. IV—extracted) | 1:1 | Yes | 1.0 | 6 |
| I | N-(2-aminoethyl) aziridine aziridine (Run 6) | 1:2 | Yes | 1.6 | 27 |
| J | N-(2-aminoethyl) aziridine (Run 7) | 1:3 | Yes | 2.5 | 11 |
| K | N-(2-aminoethyl) aziridine (Run 7A) | 1:4 | Yes | 3.2 | 5 |

ª Test blends contained 7.5 wt. percent additive in base oil A.
ᵇ The additive extracted with a mixture of pentane and methanol.

TABLE III.—EVALUATION IN THE FORD MS-VB ENGINE TEST OF LUBE COMPOSITIONS CONTAINING DERIVATIVE OF EXAMPLE II AND AZIRIDINE

| Run | Additive ª | Sludge ᵇ | Varnish ᵇ | Percent PCV valve plugging |
|---|---|---|---|---|
| A¹ | Ex. II product | 21.7 | 28.2 | 94 |
| C¹ | N-(2-aminoethyl) aziridine derivative of Ex. II product (1:1 mole ratio) | 29.5 | 37.1 | 48 |
| E¹ | Ethyleneimine derivative of Ex. II prod. (2:1 mole ratio) | 45.8 | 32.8 | 38 |

ª The additives were blended in base oil A to give a phosphorus content of 0.075 wt. percent.
ᵇ A rating of 50 is clean.

We claim:
1. A lubricating oil composition comprising a major amount of hydrocarbon lubricating oil and an effective detergent dispersant amount of aziridine derivative prepared by the method comprising:
   (a) first contacting a polyalkene of an average molecular weight between about 500 and 5000 with $P_2S_5$ in the presence of between about 0.1 and 5 wt. percent sulfur at a temperature between about 100 and 320° C., $P_2S_5$ comprising between about 5 and 40 wt. percent of the reaction mixture to form a polyalkene-$P_2S_5$ first reaction product,
   (b) second contacting the said polyalkene-$P_2S_5$ first reaction product with steam at a temperature between about 100 and 260° C., utilizing at least about a mole ratio excess of steam in respect to said polyalkene-$P_2S_5$ first reaction product to form a steam hydrolyzed polyalkene-$P_2S_5$ second reaction product,
   (c) third removing inorganic phosphorus acid from the steam hydrolyzed polyalkene-$P_2S_5$ second reaction product to form an inorganic acid free, steam hydrolyzed polyalkene-$P_2S_5$ third product,
   (d) fourth contacting said inorganic acid free, steam hydrolyzed polyalkene-$P_2S_5$ third product with ethylene oxide in a mole ratio of reaction product to ethylene oxide of between about 1 and 4 at a temperature between about 60 and 150° C. under a pressure of between about 10 and 500 p.s.i.g. to form monoethoxylated inorganic phosphorus free, steam hydrolyzed polyalkene-P₂S₅ fourth reaction product, (e) contacting said fourth reaction product with an aziridine characterized by the formula:

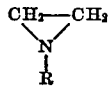

where R is hydrogen or ω-aminoalkyl of from 1 to 5 carbons at a temperature between about 25 and 130° C., utilizing a mole ratio of said fourth reaction product to aziridine of between about 3:1 and 1:2 to form said aziridine derivative.

2. A lubricating oil composition in accordance with claim 1 wherein the polyalkene-P₂S₅ reaction mixture of said step (a) prior to contact with said steam in said step (b) is diluted with mineral lubricating oil of an SUS viscosity between about 50 and 100 to form a diluted polyalkene-P₂S₅ reaction mixture having a mineral lubricating oil content of between about 25 and 75 wt. percent and contacting the resultant lubricating oil solution in accordance with steps (b), (c), (d) and (e) and wherein said contacting in steps (a) and (d) are conducted in an inert atmosphere.

3. A lubricant composition in accordance with claim 2 wherein said polyalkene is polyisobutene of a molecular weight of about 1300, said R is hydrogen and said mole ratio in step (e) is about 1:1.

4. A lubricating oil composition in accordance with claim 2 wherein said polyalkene is polyisobutene of a molecular weight of about 1300, said R is hydrogen and said mole ratio in step (e) is about 1:2.

5. A lubricating oil composition in accordance with claim 2 wherein said polyalkene is polybutene of a molecular weight of about 1300, said R is hydrogen and said mole ratio in step (e) is about 2:1.

6. A lubricating oil composition in accordance with claim 2 wherein said aziridine derivative is extracted from the final reaction mixture in step (e) with a mixture of liquid alkane and liquid alkanol of less than 7 carbons, said polyalkene is polyisobutene of a molecular weight of about 1300 and said R is 2-aminoethyl and said mole ratio in step (e) is about 1:1.

7. A lubricating oil composition in accordance with claim 2 wherein said aziridine derivatve s extracted from the final reaction mixture in step (e) with a mixture of liquid alkane and liquid alkanol of less than 7 carbons, said polyalkene is polyisobutene of a molecular weight of about 1300 and said R is 2-aminoethyl and said mole ratio in step (e) is about 1:2.

References Cited
UNITED STATES PATENTS 3,143,506    8/1964    Schallenberg et al. _ 252—46.7 X
3,321,400    5/1967    Huene et al. __ 252—32.7 HC X DANIEL E. WYMAN, Primary Examiner W. H. CANNON, Assistant Examiner U.S. Cl. X.R.

252—32.7 HC; 260—128